United States Patent
Green et al.

(10) Patent No.: US 8,930,067 B1
(45) Date of Patent: Jan. 6, 2015

(54) SYSTEM AND METHOD FOR A SUBSCRIPTION-BASED DIAGNOSTIC SOFTWARE SERVICE

(71) Applicant: NMTC, Inc., Stow, OH (US)

(72) Inventors: John Green, Aurora, OH (US); Kimber Fabrick, Hinckley, OH (US); Brian Katzenmeyer, Stow, OH (US); Jason M. Jones, Stow, OH (US)

(73) Assignee: NMTC, Inc., Stow, OH (US)

( * ) Notice: Subject to any disclaimer, the term of this patent is extended or adjusted under 35 U.S.C. 154(b) by 0 days.

(21) Appl. No.: 14/291,385

(22) Filed: May 30, 2014

Related U.S. Application Data

(60) Provisional application No. 61/988,557, filed on May 5, 2014.

(51) Int. Cl.
*G06F 7/00* (2006.01)
*G06Q 20/12* (2012.01)
*G01M 17/007* (2006.01)

(52) U.S. Cl.
CPC .......... *G06Q 20/127* (2013.01); *G01M 17/007* (2013.01)
USPC ............ 701/33.2; 702/2; 705/7.38; 705/7.41; 345/168

(58) Field of Classification Search
CPC ......... G07C 5/008; G01M 7/00; G06F 17/00; G06F 3/017; G06F 3/0426
USPC ............ 701/2, 33.2; 705/7.38, 7.41; 345/168, 345/500
See application file for complete search history.

(56) References Cited

U.S. PATENT DOCUMENTS

| | | | |
|---|---|---|---|
| 6,236,917 B1 | 5/2001 | Liebl et al. | |
| 6,816,842 B1 * | 11/2004 | Singh et al. | 705/59 |
| 6,845,307 B2 * | 1/2005 | Rother | 701/29.6 |
| 6,874,680 B1 * | 4/2005 | Klaus et al. | 235/375 |
| RE40,799 E * | 6/2009 | Chen | 701/33.2 |
| 8,024,083 B2 * | 9/2011 | Chenn | 701/31.5 |
| 8,509,986 B1 * | 8/2013 | Chen | 701/31.4 |
| 8,548,674 B2 | 10/2013 | Namaky | |
| 8,600,610 B2 * | 12/2013 | Bertosa et al. | 701/33.2 |
| 8,620,511 B2 * | 12/2013 | Rother | 701/29.1 |
| 8,694,982 B2 | 4/2014 | Wempen et al. | |
| 2006/0101311 A1 * | 5/2006 | Lipscomb et al. | 714/47 |
| 2008/0140281 A1 * | 6/2008 | Morris et al. | 701/33 |
| 2009/0112397 A1 | 4/2009 | Roberts et al. | |
| 2011/0035096 A1 | 2/2011 | Liebl et al. | |
| 2012/0155285 A1 * | 6/2012 | Smart et al. | 370/242 |
| 2012/0173418 A1 * | 7/2012 | Beardsmore et al. | 705/40 |
| 2012/0269082 A1 * | 10/2012 | Morper et al. | 370/252 |
| 2014/0164764 A1 * | 6/2014 | Pushkin et al. | 713/156 |

* cited by examiner

*Primary Examiner* — McDieunel Marc
(74) *Attorney, Agent, or Firm* — Hahn Loeser & Parks LLP

(57) ABSTRACT

Systems and methods for a diagnostic software service that utilizes a subscription model to distribute diagnostic software to diagnostic tools. A diagnostic application is installed on a mobile device. The mobile device communicates with an adapter coupled to a vehicle. An application server provides software modules to which a technician subscribes and, once subscribed, are utilized via the diagnostic application. Subscription to software modules enable the technician to add and utilize specific diagnostic functionality in an a la carte manner.

30 Claims, 10 Drawing Sheets

SYSTEM AND METHOD FOR A SUBSCRIPTION-BASED DIAGNOSTIC SOFTWARE SERVICE

CROSS-REFERENCE TO RELATED APPLICATIONS

This application claims priority to U.S. Provisional Application Ser. No. 61/988,557, filed May 5, 2014, entitled "SYSTEM AND METHOD FOR A SUBSCRIPTION-BASED DIAGNOSTIC SOFTWARE SERVICE", the entirety of which is incorporated herein by reference.

BACKGROUND OF THE INVENTION

1. Field of the Invention

This application relates generally to a diagnostic tool and diagnostic software and, more specifically, to systems and methods for provisioning diagnostic software to a diagnostic tool as a subscription-based service.

2. Description of Related Art

Vehicles are equipped with sophisticated on-board diagnostic (OBD) systems capable of monitoring vehicle systems in operation, logging and transmitting real-time performance data, and performing self-diagnostics in order to detect problems with vehicles systems and to issue appropriate diagnostic test codes (DTC). A vehicle technician can utilize the OBD systems to quickly identify issues with a vehicle. To do so, the technician utilizes a diagnostic tool capable of interfacing with the OBD of the vehicle. Generally, the diagnostic tool can retrieve DTCs set by the vehicle, obtain real-time data associated with one or more parameter identification numbers (PIDs), and, in some cases, program modules (e.g., the engine control unit (ECU) or powertrain control module (PCM)) of the vehicle according to various performance profiles.

While a set of industry standard DTCs and PIDs are implemented in many vehicles, manufacturers typically utilize non-standard or manufacturer-specific parameters and codes. Accordingly, a diagnostic tool requires software capable of addressing the proprietary parameters and deciphering the codes in order for a technician to efficiently diagnose vehicles problems. Due to the proprietary nature of the manufacturer-specific parameters and codes, diagnostic tool software comes at a great cost, which in turn increases the cost of the diagnostic tools themselves. Moreover, because the proprietary extensions to the standard DTCs and PIDs are under direct control of the manufacturers, these non-standard codes and parameters can be different between different models produced by one manufacturer and/or can change between model years for the same model. As such, software updates for diagnostic tools become necessary for technician to properly maintain newer vehicle models. Often, these software updates carry a high cost substantially equivalent to the initial software investment. In extreme cases, software updates may not be supported by a particular diagnostic tool. In these cases, technician would purchase a new diagnostic tool to work with the newer vehicle models.

In view of the expense of conventional diagnostic tools and/or the software for the tools, repair shops often have only one diagnostic tool available for use by several technicians. Such sharing arrangements can reduce revenue for the repair shops and the technicians since time is lost when the shared diagnostic tools are unavailable, i.e., some technicians cannot continue to work while other technicians are utilizing the tools.

BRIEF SUMMARY OF THE INVENTION

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, a subscription-based diagnostic software service provides cost effective distribution and utilization of software for diagnostic tools. The subscription-based service enables technicians to purchase subscriptions to diagnostic software. The subscriptions can cover a range of makes and models as desired or as needed by the technicians. Using a subscription model, high, up-front costs of software to access proprietary codes and parameters unique to specific manufacturers and/or models are avoided. Rather, a subscription to software to one or more makes, models, model years, or manufacturing groups (i.e., foreign makes, domestic makes, German makes, Japanese makes, etc.) is purchased. Moreover, the subscription-based software service enables lower cost mobile tools to be utilized with the diagnostic software. Thus, technicians are provided an affordable diagnostic tool without having to share the diagnostic tools with other technicians in order to also share the cost.

These and other embodiments are described in more detail below.

BRIEF DESCRIPTION OF THE DRAWING

Various non-limiting embodiments are further described with reference the accompanying drawings in which.

DETAILED DESCRIPTION OF THE INVENTION

General Overview

Figure 1:
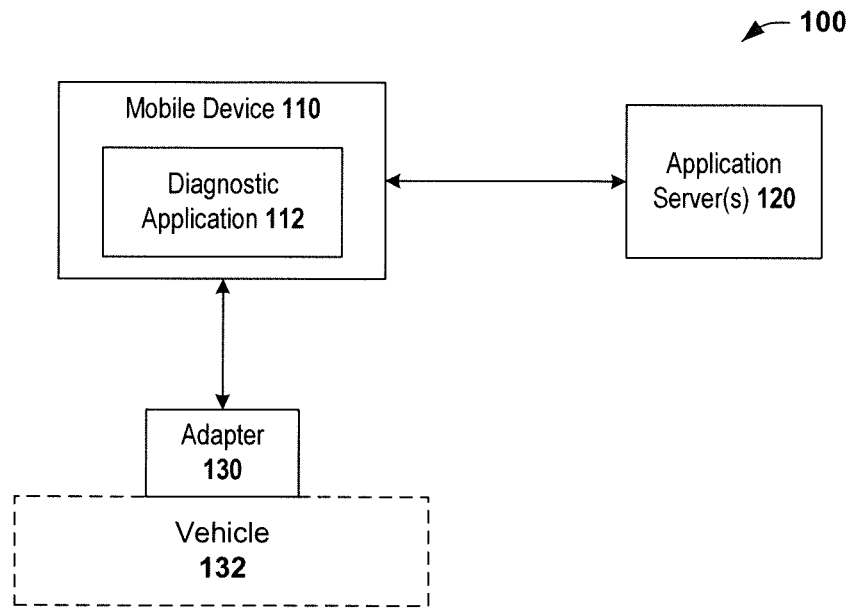
FIG. 1 is a block diagram of an exemplary, non-limiting embodiment for a subscription-based diagnostic software service according to one or more aspects.

As discussed in the background, conventional diagnostic tools such as handheld or portable diagnostic computers or tablet devices can be expensive due in part to a high cost for software licenses associated with diagnostic software installed on the tools. As computing technology advances, computing devices generally trend towards lower cost for a given performance. However, while hardware associated with the diagnostic tools can become lower cost, the software licenses for the software continue to maintain an overall high cost for the tools. This high cost, in turn, creates a prevalence for technicians to share diagnostics tools within a repair shop, thus, reducing overall revenue generation.

In various, non-limiting embodiments, a system and associated methods are provided for a diagnostic software service that utilizes a subscription model to distribute diagnostic software to diagnostic tools. A diagnostic application is installed on a mobile device (e.g., a portable computer, a tablet computing device, a smartphone, a personal digital assistant, or substantially any portable, mobile computing device). The mobile device, and specifically the diagnostic application, communicates with an adapter which can be coupled to a vehicle. The mobile device and adapter can communicate via substantially any wired or wireless means to transfer error codes, real-time data, or programmable vehicles settings between the diagnostic application and the vehicle.

According to one or more aspects, the diagnostic application includes integrated modules and extension modules. The integrated modules provide features and functionality that is pre-installed or pre-bundled with the diagnostic application. The extension modules include software modules providing features and functionality that can be subscribed to by a technician and, once subscribed, can be utilized via the diagnostic application. The extension modules, according to one example, can be installed or downloaded to the diagnostic application upon subscription. That is, the extension modules are not pre-installed or pre-bundled with the diagnostic application. However, it is to be appreciated that the extension modules can be bundled with the diagnostic application but remain unavailable or locked until coupled with an active subscription.

Extension modules provided according to a subscription model enable a technician to add and utilize specific diagnostic functionality in an a la carte manner. Accordingly, the technician can lower the cost of diagnostic software to only what is necessary for desired functionality while also reducing costs associated with changing needs (i.e., repairs on newer or different vehicles than before). For instance, the subscriptions associated with extension modules can be changed annually, monthly, or substantially any other time frame, to remove features no longer needed and/or to add features newly required. Thus, the diagnostic application changes with the needs of technicians without the upfront high cost of software licenses.

In one embodiment, a system for a subscription-based diagnostic software service is described herein. The system can include a mobile device having a processor and a non-transitory, computer-readable storage medium, the non-transitory computer-readable medium having stored thereon computer-executable instructions for a diagnostic application. The diagnostic application is extendable to perform diagnostic scans of a plurality of vehicle types. The system further includes an application server configured to extend the diagnostic application by downloading one or more diagnostic scan modules to the diagnostic application and to maintain a set of diagnostic scan modules of the diagnostic application in accordance with a service agreement.

According to an example, each diagnostic scan module, of the one or more diagnostic scan modules, is configured to perform a diagnostic scan on a respective vehicle make. In addition, the set of diagnostic scan modules includes one or more groups of diagnostic scan modules partitioned according to regional associations of vehicle makes. The service agreement can cover the one or more groups of diagnostic scan modules as collective units.

The system can further include an adapter configured to communicatively couple the mobile device to a vehicle to enable transmission of diagnostic data from the vehicle to the diagnostic application on the mobile device. The adapter couples to a diagnostic port on the vehicle and comprises a wireless communication interface to communicate with the mobile device. The adapter can include a unique identifier. According to an example, the service agreement is linked to the unique identifier. The diagnostic application enables access to the set of diagnostic scan modules only in connection with the adapter having the unique identifier linked with the service agreement associated with the set of diagnostic scan modules.

The service agreement can comprise a subscription for the set of diagnostic scan modules. In accordance with the service agreement, the subscription comprises a subscription term and a payment schedule.

The application server maintains the set of diagnostic scan modules by updating one or more modules of the set of diagnostic scan modules to new versions. For example, the application server can transmit updates to the one or more modules of the set of diagnostic scan modules provided the service agreement is active. The application server can also maintain the set of diagnostic scan modules through evaluation of an application profile of the diagnostic application and the service agreement to verify the set of diagnostic scan modules includes all modules specified in the service agreement. Further, the application server maintains the set of diagnostic scan modules by deactivating one or more diagnostic scan modules of the set of diagnostic scan modules when the service agreement is inactive. In addition, the application server is further configured to transmit one of product catalog data or promotional data to the diagnostic application.

According to another embodiment, a method of provisioning diagnostic software to a diagnostic tool is described. The method include receiving a selection of one or more diagnostic software modules from a technician via a diagnostic application executing on the diagnostic tool. The method further includes generating a service agreement covering the one or more diagnostic software modules selected in accordance with a selected service level. Further, the method includes transmitting the one or more diagnostic software modules to the diagnostic application on the diagnostic tool. In addition, the method can include maintaining the one or more diagnostic software modules on the diagnostic tool in accordance with the service agreement.

In an aspect, maintaining the one or more diagnostic software modules can include updating the one or more diagnostic software modules to newer version in accordance with the service agreement. In another aspect, maintaining the one or more diagnostic software modules comprises deactivating the one or more diagnostic software modules on the diagnostic tool when the service agreement is invalid.

According to an example, the one or more diagnostic software modules comprise one or more diagnostic scan modules configured to obtain at least one of diagnostic trouble codes or parameter IDs from a vehicle. The one or more diagnostic scan modules can respectively correspond to respective vehicle makes. According to an aspect, receiving the selection of the one or more diagnostic scan modules can comprise receiving a selection for a regional group of vehicle makes.

In further aspects, the service agreement comprises a subscription for the one or more diagnostic software modules, the subscription having a term and a payment schedule. Accordingly, the method can further include receiving acknowledgement of the service agreement, the term, or the payment schedule; receiving payment information from the technician via the diagnostic application executing on the diagnostic tool; and managing the service agreement with the payment information, for the term, in accordance with the payment schedule.

In yet another aspect, the method can include downloading support data to the diagnostic application executing on the diagnostic tool. The support data can include at least one of product catalog information, promotional information, or information regarding authorized distributors of products. Further, the method can also include receiving location information from the diagnostic application executing on the diagnostic tool and customizing the support data downloaded to the diagnostic application based on the location information.

In a further embodiment, a system for a subscription-based diagnostic software service is described. The system can include a mobile device having a processor and a non-transitory, computer-readable storage medium, the non-transitory computer-readable medium having stored thereon computer-executable instructions for a diagnostic application. The diagnostic application being extendable via subscription to one or more diagnostic software modules downloadable to the diagnostic application. The system further includes an application server configured to extend the diagnostic application by downloading one or more diagnostic software modules to the diagnostic application subscribed to by a technician via the diagnostic application on the mobile device. The application server is further configured to maintain a set of diagnostic software modules of the diagnostic application in accordance with a subscription for the set of diagnostic software modules. In addition, the system includes an adapter configured to communicatively couple the mobile device to a vehicle to enable transmission of diagnostic data from the vehicle to the diagnostic application on the mobile device. The system, according to an example, can also include a retail point-of-sale system communicatively coupled to the application server, wherein the application server is further configured to record subscription purchases by the technician via the diagnostic application to the retail point-of-sale system.

According to an aspect, the diagnostic application comprises a set of integrated modules and a set of extension modules. The set of integrated modules can include a catalog module configured to display product catalog information, to enable browsing of the product catalog information by the technician, and to obtain orders for a product from the technician, a promotions modules configured to display promotional information to the technician, a location module configured to maintain one or more locations associated with at least one of the technician or the mobile device, and a management module configured to enable administration of at least one of user profiles, application profiles, or service agreements associated with the diagnostic application. The management module is further configured to periodically connect to the application server to verify validity of the subscription. The set of extension modules can include the set of diagnostic software modules downloaded to the diagnostic application in accordance with the subscription. The set of diagnostic software modules includes at least one of: a diagnostic scan module configured to obtain and analyze at least one of diagnostic trouble codes or parameter IDs from a vehicle via the adapter; a service module configured to obtain at least one of a service manual for the vehicle or specific information for a identified issue with the vehicle; or a diagnostic module configured to test at least one of a battery, an anti-lock brake system, an airbag, or a drivetrain.

According to another aspect, the application server can include a backend module configured to communicate with the diagnostic application of the mobile device to exchange information related to purchasing and management of the subscription for the set of diagnostic software modules. The application server can also include an accounting module configured to automatically process payment for the subscription in accordance with a term and a payment schedule, to record processed payments to a retail point-of-sale system, and to transmit subscription information to an auxiliary system associated with vendors of diagnostic software modules distributed via the subscription-based diagnostic software service. In addition, the application server includes a profile data store configured to store user profiles associated with registered technicians and subscription information associated with subscription purchased by the registered technicians. According to an example, the backend module is configured to download diagnostic software modules, of the set of diagnostic software modules, to the diagnostic application; verify fulfillment of the subscription by comparing an application profile received from the diagnostic application with subscription information retained by the profile data store; update one or more diagnostic software modules, of the set of diagnostic software modules, to newer versions when available; deactivate the set of diagnostic software modules when the subscription is invalid; and download support data to the diagnostic application.

An overview of some embodiments for an subscription-based diagnostic software service has been presented above. As a roadmap for what follows next, the subscription-based diagnostic software service is described in more detail. Afterwards, an exemplary computing device and computing environment, in which such embodiments and/or feature described above can be implemented, are described. The above noted features and embodiments will be described with reference to the drawings, wherein like reference numerals are used to refer to like elements throughout.

Subscription-Based Diagnostic Software Service

As mentioned above, in various embodiments, a subscription-based diagnostic software service enables distribution and utilization of software for diagnostic tools at a low cost. Technicians can acquire service agreements for customized sets of software features covering functionality respectively desired by each technician as opposed to a complete set of functionality bundled with the diagnostic tools. The service agreements can include subscriptions for software, pay-per-use agreements for software, or the like. Thus, providing diagnostic software as a service enables software licensed for use by the technicians on diagnostic tools to change when the needs of the technicians change.

FIG. 1 shows a block diagram illustrating an exemplary, non-limiting embodiment for a subscription-based diagnostic software service. Specifically, FIG. 1 illustrates a system 100, which can implement the subscription-based diagnostic software service. System 100 can include a mobile device 110 having a diagnostic application 112 thereon. The mobile device 110 communicates with application server(s) 120 configured to support the diagnostic application 112. For instance, the application server(s) 120 can manage service agreements (e.g., subscriptions, etc.) for software on a plurality of mobile devices similar to mobile device 110, download software modules to the mobile device 110, push support data for diagnostic application 112 to the mobile device 110, push software updates to diagnostic application 112 or installed software modules to mobile device 110, and perform backend accounting and billing associated with software subscriptions, fulfillment, and updates.

The diagnostic application 112 also communicates with an adapter 130 configured to interface with a vehicle 132. According to an example, the adapter 130 interfaces with a data link connector, such as an OBD-II connector, of vehicle 132 to access the control modules or units of vehicle 132. The adapter 130 can transmit data associated with the control modules of vehicle 132 to the diagnostic application 112. Such data can include error codes, fault messages, real-time data, parameters values, and the like. In addition, the adapter 130 can forward commands or values for programmable settings from the diagnostic application 112 to the control modules of the vehicle 132.

In an aspect, the adapter 130 and the mobile device 110 can communicate via a wired or wireless medium. For instance, the mobile device 110 and adapter 130 can be coupled via a cable, e.g., USB cable, serial cable, Ethernet cable, or the like. In another example, the adapter 130 can the mobile device 110 can communicate wirelessly via WiFi (e.g., IEEE 802.11), cellular radio (e.g., GSM, LTE, CDMA, HSPA, UMTS, WiMAX, etc.), near-field communication, infrared, a short-range radio frequency (RF) protocol such as Bluetooth, or substantially any other wireless communication technology.

The mobile device 110 and application servers 120 can communicate via the Internet, a local area network (LAN), a wide area network (WAN), or a combination thereof over one or more wired or wireless links. For example, the mobile device 110 can connect wirelessly, via WiFi or the like, to a first LAN or WAN. The first LAN or WAN, in turn, is connected via a cellular communication link or a wired link to the Internet. Also, connected to the Internet is a second LAN or WAN to which the application servers 120 are connected wired or wirelessly. It is to be appreciated that the above connection scheme is an example of one possible setup and that other network topologies are employable with the aspects described herein and the claimed subject matter. For instance, system 100 can be implemented as a cloud-based or Internet-based system. Accordingly, the a subscription-based diagnostic software service provided by system 100 can be a cloud service and, as such, a nebulous networking and/or computing structure, generally opaque to mobile device 100, implements application servers 120 and enables access to the application servers 120 by mobile device 110 via one or more exposure points (e.g., IP addresses, web addresses, network addresses, domain names, uniform resource indicators (URIs), application program interfaces (APIs), etc.). In this manner, the application servers 120 can execute on one or more physical computing devices (i.e., hardware) located remotely from mobile device 110 such as in a data center or other installation. In addition, the application servers 120 can also execute on one or more virtual machines, which in turn, execute on one or more physical computing devices. In this way, the diagnostic software service provided by the application servers 120 can be modified (e.g., relocated to different physical hardware, scaled up (i.e., given greater resources), scaled down (i.e., given less resources), etc.) without disruption to mobile device 110.

Figure 2:
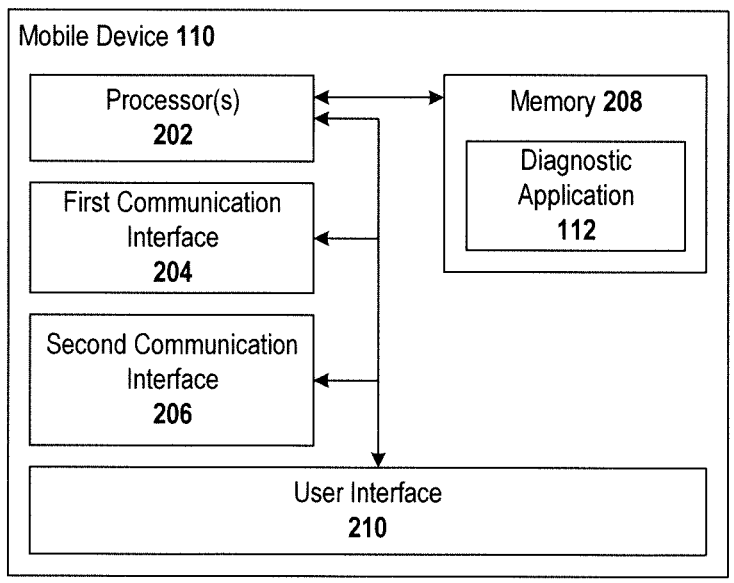
FIG. 2 is a block diagram of an exemplary, non-limiting mobile device according to one or more aspects.

Turning to FIG. 2, a block diagram of an exemplary, non-limiting embodiment of mobile device 110 is illustrated. Mobile device 110 includes one or more processor(s) configured to execute computer-executable instructions such as instructions composing diagnostic application 112. Such computer-executable instructions can be stored on one or more computer-readable media including a non-transitory, computer-readable storage medium such as memory 208 of mobile device 110.

Mobile device 110 includes a first communication interface 204 and a second communication interface 206. As shown in FIG. 2, first communication interface 204 can couple mobile device 110 to the adapter 130. As described above, first communication interface 204 can be a wired or wireless interface including, but not limited, a USB interface, a serial interface, a WiFi interface, a short-range RF interface (Bluetooth), an infrared interface, a near-field communication (NFC) interface, etc. Second communication interface 206 can couple mobile device 110 to the application servers 120. As such, second communication interface 206 can be a WiFi interface, an Ethernet interface, a fiber optic interface, a cellular radio interface, a satellite interface, etc. While shown separate in FIG. 2, first communication interface 204 and second communication interface 206 can be a single interface or an interface capable of simultaneous communication over multiple connections.

Mobile device 110 can further include a user interface 210 that comprises various elements to obtain user input and to convey user output. For instance, user interface 210 can comprise a touch display which operates as both an input device and an output device. In addition, user interface 210 can also include various buttons, switches, keys, etc. by which a user can input information to mobile device 110, and other displays, LED indicators, etc. by which other information can be output to the user.

In accordance with an embodiment, mobile device 110 is a computing device, which is readily carried by a technician such a smartphone or tablet device. However, it is to be appreciated that mobile device 110 can be other portable form-factors such as a laptop computer, a convertible laptop, a cell phone, a PDA, a pocket computing device, a watch computing device, or the like. Moreover, while referred to as "mobile" it is to be appreciated that the functionality described herein with respect to mobile device 110 can be performed by a desktop computer, or other larger, less portable computing device. That is, diagnostic application 112 can be installed and executed on substantially any computing device provided that such a computing device can communicated with adapter 130 and application servers 120 as described above with regard to FIG. 1.

Still further, the mobile device 110 can be a personal device of the technician. That is, mobile device 110 can be a version of a mobile computing device marketed and sold to consumers. Alternatively, it is to be appreciated that mobile device 110 can be a specialty device such as, for example, a customized device having a hardened housing to withstand a shop environment.

Figure 3:
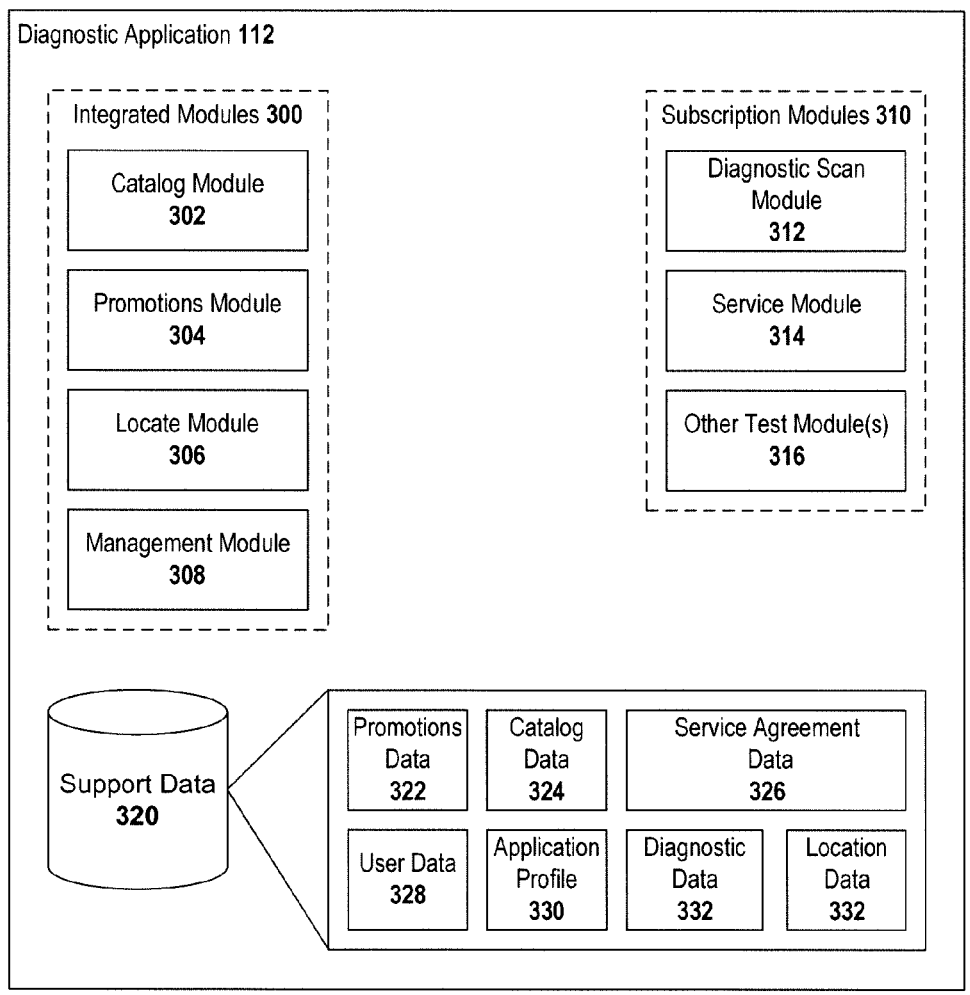
FIG. 3 is a block diagram of an exemplary, non-limiting diagnostic application according to one or more aspects.

FIG. 3 illustrates a block diagram of an exemplary, non-limiting embodiment of diagnostic application 112 according to one or more aspects. Diagnostic application 112 comprises computer-executable instructions and computer-readable data stored on memory 208 of mobile device 110. The computer-executable instructions of diagnostic application 112 are executable by processor 202 of mobile device 110.

As shown in FIG. 3, diagnostic application 112 can include a set of integrated modules 300, a set of extension modules 310, and support data 320. The set of integrated modules 300 and the set of extension modules 310 include computer-executable instructions implementing various features, processes, operations, etc. of diagnostic application 112. The set of integrated modules 310 include portions of computer-executable code, which are built-in (i.e., pre-bundled) with the computer-executable code of the diagnostic application 112. The set of extension modules 310 include portions of computer-executable code, which are not pre-bundled or built-in with the computer-executable instructions of the diagnostic application 112. Rather, the set of extension modules 310 include add-on processes, functions, applications, etc., which a user of diagnostic application 112 (i.e., a technician) acquires in order to utilize the functionality implemented thereby. According to one example, a service agreement can be generated between a technician (i.e., user of diagnostic application 112) and an application/service provider (e.g., provider of diagnostic application 112, provider of the diagnostic software service, and/or operator of application server 120). The service agreement can specify software modules to be provided to diagnostic application 112 as extension module 310 as well as conditions of use for those software modules. In accordance with the service agreement, the set of extension modules 310 can be downloaded by diagnostic application 112 from application server 120 to enable access and utilization by the technician.

It is to be appreciated that computer-executable code of the set of extension modules 310 can be built-in with diagnostic application 112. In such cases, the extension modules 310 are deactivated or otherwise unavailable for execution until subject to a service agreement. In yet another example, the set of extension modules 310 can be stored externally of diagnostic application 112 (i.e., remote from mobile device 110) and accessed via a application program interface (API) provided in accordance with the service agreement. Further to this example, diagnostic application 112 can transfer data received from vehicle 132 via adapter 130 to a remote system (e.g. application server 120) having the set of extension modules 310 in the form of an API request to a module. However, it is to be appreciated that other mechanisms to access remotely located modules can be utilized and the claimed subject matter is not limited to API-level access. When the technician is authorized (i.e., has a service agreement covering the functionality requested), the remote system responds with results of execution of the requested module.

The set of integrated modules 300 includes a catalog module 302, a promotions module 304, a location module 306, and a management module 308. According to an aspect, the catalog module 302 provides a product catalog through which a user can browse available products for sale and place an order for products. The products can be diagnostic tools, hand tools, power tools, accessories, tool boxes and cases, and/or substantially any products useful in a vehicle repair shop or by a technician. Accordingly, while performing diagnostics and tests on vehicle 132 with diagnostic application 112, a technician can identify a tool needed for a task, launch the catalog module 302 to browse the catalog, and utilize the catalog module 302 to find and purchase the tool.

The promotions module 304 outputs promotional information and advertisements to users of the diagnostic application 112. For example, on a home screen of diagnostic application 112, a banner promotion can be displayed by the promotions module 304. The banner promotion can be periodically cycled with updated promotions based on information received from application server 120 and retained as part of support data 320. Moreover, the promotions module 304 can retrieve and display a current promotional flyer that provides information on current promotions, deals, announcements, etc. The promotional information can relate to an application provider of diagnostic application 112 and/or mobile device 110, a service provider managing application server 120 and distributing diagnostic application 112, trusted third parties, etc. However, it is to be appreciated that the application provider and the service provider can be identical entities as is common with software-as-a-service models.

Location module 306 can utilize an address input by the technician or a specific location generated through self-locating mechanisms of mobile device 110 to provide location-based functionality and support to the technician. A location, whether a mailing address, triangulated position, global position, or the like, is maintained by location module 306. It is to be appreciated that multiple locations or types of location can be maintained. For instance, one location maintained can be a technician location specific to a technician, such a mail address. Another location maintained can be a dynamic location related to the mobile device 110 or diagnostic application 112. Accordingly, location-based services can be provided according to theses different types of location. For example, some services can be provided based on a general or regional location of a technician currently utilizing diagnostic application 112. These service can often be technician-specific and depend on the technician utilizing diagnostic application 112. According to another example, other services can be provided based on a specific or device level location related to mobile device 110, which can be technician-agnostic and employable in situations where two or more technicians share use of mobile device 110 and/or diagnostic application 112.

According to an aspect, location module 306 enables a technician to find a distributor of products sold by the application/service provider. That is, the diagnostic application 112, utilizing the location(s) maintained by the location module 306, can identify an authorized distributor or reseller of the products included in the products catalog accessible with the catalogs module 302. In further aspects, the location(s) maintained by the location can be utilized by other modules, such as the catalog module 302 or promotions module 304 to provide customized and/or personalized promotions, customized catalog organization, product recommendations, distributor information, etc., which are based on location.

Management module 308 provides administration functions, configuration of diagnostic application 112, or the like. For example, management module 308 enables administration (e.g., retrieval, display, and editing) of user profiles, application profiles and/or service agreements. In addition, management module 308 enables registration of technicians with application server 120 and configuration of payment information. Moreover, management module 308 can perform server agreement management on the mobile device 110. For instance, the management module 308 can disable access to the set of extension modules 310 when a service agreement expires. Further, the management module 308 can required the diagnostic application 112 to periodically check-in with the application server 120 to verify the service agreement is valid and that no unauthorized use of the set of extension modules 310 occurs.

The set of extension modules 310, as described above, include modules which are downloaded to diagnostic application 112 in accordance with a service agreement. Such modules can include one or more diagnostic scan modules 312 configured to retrieve and analyze diagnostic trouble codes and real-time data from vehicles, such as data vehicle 132 received via adapter 130; a service module 314 configured to retrieve service manuals for vehicles or specific fix information for a problem identified by the diagnostic scan modules 312, and to calculate service estimates based the problem identified; and other diagnostic modules 316 such as battery testers, pressure testers, anti-lock brake system diagnostics, airbag diagnostics, drivetrain diagnostics, or the like. As described previously, vehicle manufacturers typically implement unique trouble codes and/or parameters IDs associated with real-time data. Accordingly, diagnostic scan modules 312 can comprise a set of diagnostic scan modules for specific makes, models, regions, and/or model years.

According to an aspect, each of the above modules can be subject to separate service agreements or aggregated into one or more groups, respectively associated with one or more service agreements, depending on the type of service desired and the modules desired. One type of service provided can be a pay-per-use service where the technician pays for each use of an extension module 310. What defines a "use" can vary from extension module to extension module and can be codified in the corresponding service agreement. For example, for service module 314, a "use" can be granular and include one search for a specific fix, one retrieval of a service manual, one estimate calculation, or the like. For diagnostic scan modules 312 and/or other diagnostic modules 316, a "use" can be similarly granular and include one scan of a vehicle or one diagnostic test, respectively. In another example, a "use" can include unlimited utilization of a software module for a time period. For instance, any action performed via the software module can trigger a "use" which is paid for according to the service agreement; however, continued actions via the software module, for a given time period, will not trigger additional "uses". Such a time period can span an hour, several hours, a day, etc.

Another type of service can be a subscription service, which involves a subscription to one or more extension modules 310 according to the service agreement (e.g., the terms of the subscription). With the subscription, the technician can have unfettered access to the extension modules 310 subscribed to for the lifetime of the subscription. Subscriptions can have a variety of durations and payment schedules. For instance, subscriptions can be annual, monthly, weekly, etc. In addition, subscriptions can have unbounded durations and remain active provided regular payments are rendered according to the payment schedule established in the service agreement. Moreover, subscriptions can involve single payments congruent with the duration, or have installment payments. For example, a subscription to manufacturer-specific diagnostic functionality can have an annual duration with monthly payments. Subscriptions can be set for automatic renewal upon expiration of the term, or set to require explicit indication of renewal from subscribers. Moreover, subscriptions can be cancelled before the end of the term, with or without a penalty, or changed at any time. To illustrate the malleability of subscriptions, consider a specific example in which a technician subscribes to a particular make for a one year term with a fixed monthly payment. Two months after the initial subscription, the user can decide to subscribe to an additional make. The subscription can be updated to reflect a higher monthly payment for a subscription to two makes. Moreover, the term of the updated subscription can remain unchanged (i.e., the term for the second make expires after 10 months) to align terms for both makes to the same renewal date. Alternatively, the addition of the new make can effectively cancel the previous subscription, without penalty, and generate a new subscription for two makes having a one year term. From the forgoing examples, it is to be appreciated that subscriptions to specific modules, sub-modules, functionality, applications, or information accessible via diagnostic application 112 can have a wide variety of parameters and characteristics. Such characteristics can be determined by the provider of diagnostic application 112 and/or third-party vendors providing specific functionality and modules subscribable via the diagnostic application 112.

Extension modules, such as the set of extension modules 310, can be made available for a la carte selection by diagnostic application 112. However, it is to be appreciated that, in addition to individual selection, extension modules can be available for selection as bundles or groups. For example, diagnostic scan modules 312, as described above, can include separate modules for specific makes, models, and/or model years. Each of the these separate modules can be separately selected to be provided as a service (e.g., subscription service, pay-per-use service, etc.), or selected as groups according to various aggregation levels or schemes. For instance, scan modules can be subscribed to based on model-year (e.g., 2008 to 2012), make (e.g., Ford®), model (e.g., F-150®), geographic or regional groupings (e.g., Domestic, Asian, or European), or various combinations thereof.

In a specific example, subscriptions (or pay-per-use service agreements) are available diagnostic scan modules 312 according to vehicle make (i.e., manufacturer). That is, a technician can purchase subscriptions to diagnostic functionality associated with specific vehicle makes or manufacturers for use via diagnostic application 112. Such subscriptions can include diagnostic functionality for every model released by the specific vehicle makes or manufacturers for all model years. Moreover, subscriptions are available to geographical or regional groupings of vehicle manufacturers such as Domestic, European, Asian, etc.

Service agreements associated with groups or bundles of software modules can be provided at a discount. For instance, if a subscription to one vehicle make is $X/month, then a subscription to ten individual makes can be $Y/month and reflect a price reduction, by some predetermined percentage, from a total price of ten individual makes. Moreover, a subscription to a regional group of makes can be similarly discounted and/or offered at a special bundle price. Further still, a full subscription to all functionality available can carry a subscription fee less than the sum of individual fees.

As shown in FIG. 3, diagnostic application 112 includes various support data 320. Support data 320 includes promotions data 322 for promotions module 304; catalog data 324 for catalog module 302; service agreement data 326 for diagnostic application 112 to maintain appropriate access to the set of extension modules 310; user data 328 indicating one or more user accounts or profiles for diagnostic application 112; application profile 330 which details installed or accessible extension modules; diagnostic data 332 including data generated by diagnostic scan modules 312, other diagnostic modules 316, and/or retrieved from vehicle 132 via adapter 130; and location data 334 representing the locations maintained by location modules 306 and other location-based information accessible or employable by promotions modules 304, catalog module 302, or other functions of diagnostic application 112. According to an embodiment, multiple technicians can utilize diagnostic application 112 by maintaining separate user accounts or profiles. Each technician is provided access to software modules according to his or her service agreement, but not software modules associated with service agreements of other technicians. Accordingly, service agreement data 326 and user data 328 can be stored in association with one another. Moreover, as an additional check against unauthorized use of software modules, each service agreement can be linked to an identifier associated with the mobile device 110 and/or adapter 130 such that the software modules are only authorized, and accessible, from the linked mobile device 110 and/or adapter 130. When service agreements are linked to the identifier of adapter 130, the technician can easily transfer diagnostic application 112 and extension modules to a new device in the event of loss of damage to an original device on which the service agreements were acquired. Moreover, as described later, service agreements and user profiles can also be retained by application server 120. Accordingly, multiple technicians can utilize respective software modules, corresponding to multiple service agreements, on multiple devices executing diagnostic application 112. For instance, a technician can login to the diagnostic application 112 on a new device, the device contacts the application server 120 to retrieve service agreements corresponding to the technician, and appropriate software modules can be downloaded or unlocked on the new device in accordance with the service agreements.

Figure 4:
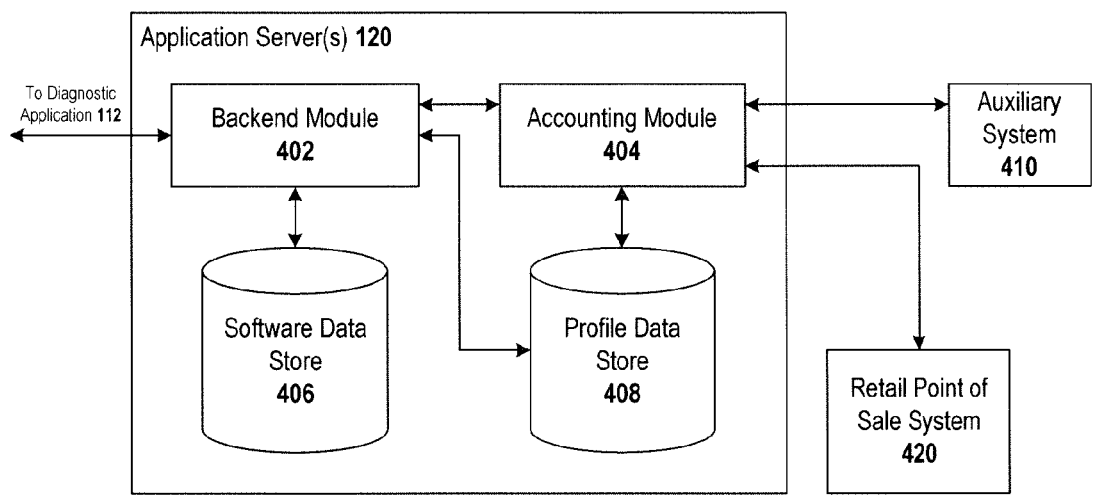
FIG. 4 is a schematic diagram of an exemplary, non-limiting application server in accordance with one or more aspects.

Turning now to FIG. 4, illustrated is an exemplary, non-limiting embodiment of an application server 120. It is to be appreciated that application server 120 can be a single server or a group of servers operating jointly to support diagnostic application 112. As understood by one of ordinary skill in the art, a server is computing device comprising one or more computer processors coupled to a memory (e.g., a non-transitory, computer-readable storage medium) storing computer-executable instructions for providing a service or remote functionality to one or more client devices such as mobile device 110 running diagnostics application 112. The server can be a virtual machine including virtualized hardware elements executing on one or more physical computing devices. According to another embodiment, the application server 120 can be a package of computer-executable instructions and computer-readable data, which is executed on a virtual platform. The virtual platform can include an bundle of computing resources provided by one or more physical computing devices and can provide an execution environment for the application server 120. In other words, application server 120 can be provided as a cloud-based service and, further, can be provided on top of additional cloud computing services (e.g., platform-as-a-service, infrastructure-as-a-service, etc.).

As shown in FIG. 4, application server 120 includes a backend module 402 configured to communicate with diagnostic application 112 to receive information from and send information to the diagnostic application 112. Such information transmitted by diagnostic application 112 and received by backend module 402 can include user credentials for authentication, service agreement information for verification, request to retrieve service agreement information and/or user profiles retained on profile data store 408, requests for changes to service agreements, requests for updated support data, download requests for software modules retained by software data store 406, payment information, and the like. Information transmitted to the diagnostic application 112 by backend module 402 can include software modules, from software data store 406, subject to an active service agreement, service agreement information maintained by application server 120 for verification and/or restoration by diagnostic application 112, user profile information for restoration by diagnostic application 112, updates to support data, commands to diagnostic application 112 to change service agreement statuses on mobile device 110, notifications regarding service agreement statuses, and the like.

Accounting module 304 is configured to provide service agreement management, billing, and crediting to third parties. For instance, accounting module 304 can automatically manage invoicing and/or charging for active service agreements maintained by profile data store 408 according to payment schedules and terms included in service agreement information. Accounting module 304 manages service agreement status in cases of non-payment. For example, accounting module 304 can transition a service agreement from an active status to a non-payment status having a grace period. Upon continued non-payment upon expiration of the grace period, accounting module 304 can deactivate the service agreement and notify backend module 302 to issue an appropriate command to the corresponding diagnostic application 112 to disable the software stored thereon.

Moreover, the accounting module 304 can periodically transmit information regarding service agreements and/or software utilization to an auxiliary 410 for invoicing by third-party vendors of software modules. For example, application server 120 can provide software, developed by the third-party vendor, to technicians according to various service agreements. Accounting module 304 provides information regarding software utilization to the auxiliary system 410 to enable the third-party vendors to invoice the application/service provider (i.e., entity providing application server 120 and/or diagnostic application 112) according to a pre-arranged license agreement for the software.

Further still, accounting module 304 can interface with a retail point of sale (POS) system 420 to record sales (e.g., service agreement signups, subscriptions, products sales via catalog module 302, etc.) to a distributor. According to an aspect, the service provider can generally operate according to a franchise model where the service provider does not provide products and services directly to end users (i.e., technicians). Rather, the service provider operates through distributors. Thus, while the systems described herein involve direct interaction between the service provider and the technicians via the diagnostic application 112 and application server 120, transactions made by technicians are recorded at the retail POS system 420. According to one example, the distributor can directly sell adapter 130 or mobile device 110 to a technician. This sale is recorded in the retail point of sale system 420 and transmitted to application server 120. Accordingly, when the technician links the mobile device 110 and/or the adapter 130 to a service agreement, the accounting module 404 identifies the associated distributor in order to record the acquisition of the service agreement to the retail point of sale system 420.

In view of the exemplary, non-limiting devices, servers, and systems described supra, various methodologies can be implemented in accordance with the disclosed are better appreciated with reference to flow diagrams of FIGS. 5-11. The flow diagrams are shown and described as a series of blocks. However, the claimed subject matter is not limited by the order of the blocks depicted and described herein, as some blocks can occur in different orders and/or concurrently with other blocks.

Figure 5:
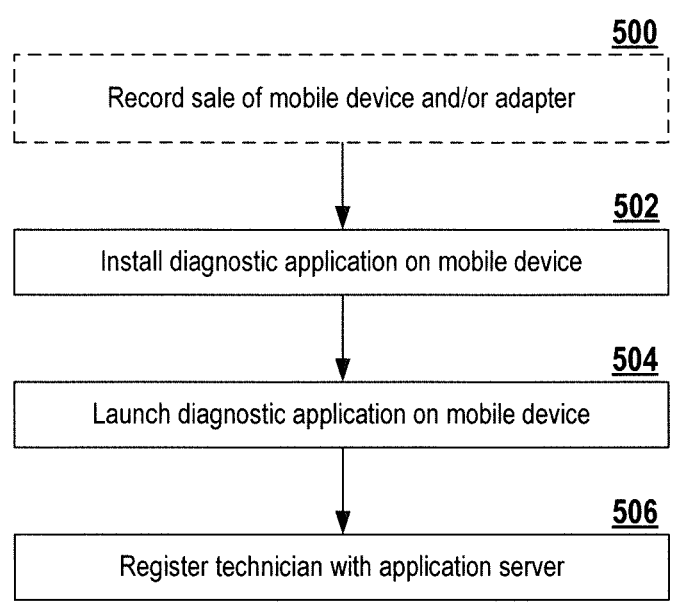
FIG. 5 is a flow diagram of an exemplary, non-limiting method for registering a user within the subscription-based diagnostic software service.

Turning now to FIG. 5, a flow diagram of an exemplary, non-limiting method for registering a technician within the subscription-based diagnostic software service is illustrated. At 500, a sale is recorded of a mobile device capable of running a diagnostic application and/or of an adapter configured to interface the diagnostic application to a vehicle. As described above, the sale can be performed by a distributor, associated with the service/application provider, directly to a technician and recorded in a retail point of sale system which is communicatively coupled to an application server supporting the diagnostic application. At 502, the diagnostic application is installed on the mobile device. It is to be appreciated that the diagnostic application can be pre-installed on the mobile device prior to the sale at 500. Alternatively, the diagnostic application can be downloaded and installed from an application repository associated with an operating system of the mobile device. At 504, the diagnostic application is launched (i.e., executed) on the mobile device. At 506, the technician completes a registration via the diagnostic application. The diagnostic application retains user data as described above and further transmit user data to the application server to complete the registration process. Accordingly, with user data stored on the mobile device, the diagnostic application can operate without maintaining an active connection to the application server. Moreover, with user data stored on the application server, the technician can utilize the diagnostic application on another mobile device.

Figure 6:
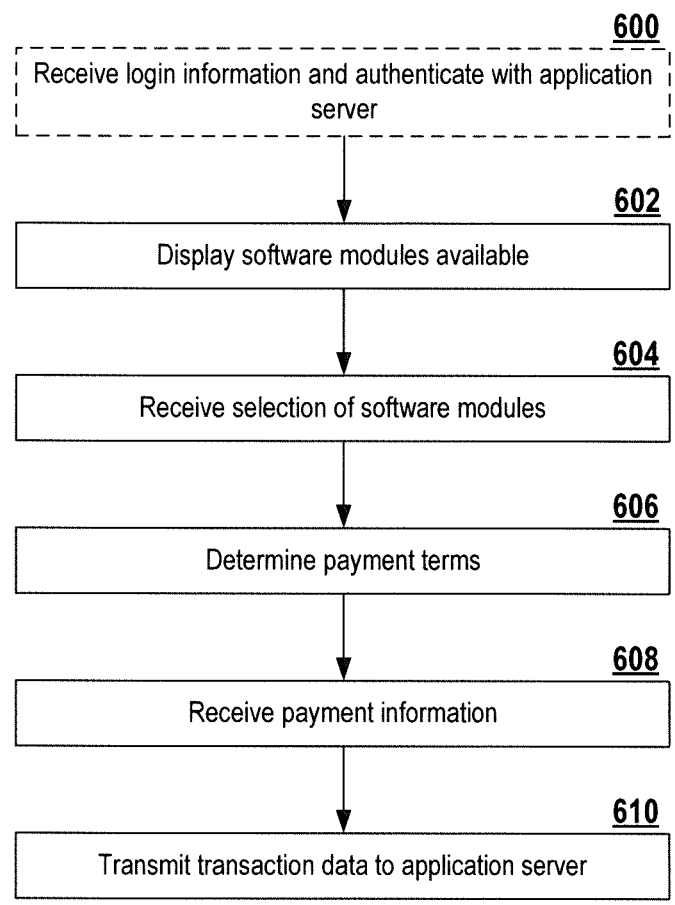
FIG. 6 is a flow diagram of an exemplary, non-limiting method for purchasing a subscription to diagnostic software.

FIG. 6 illustrates a flow diagram of an exemplary, non-limiting method for acquiring a service agreement, such as a subscription, to diagnostic software. According to an aspect, this process can be performed by the diagnostic application 112 of mobile device 110 described supra. At 600, login information is received from a technician. The login information can be authenticated with the application server and/or with stored user data on the mobile device. Following authentication, service agreement information can be retrieved from either a memory of the mobile device and/or the application server. Moreover, following authentication, personalized content and/or promotions, based on either an identity of the technician or location data, can be retrieved from the application server for display. At 602, based on service agreement information retrieved, software modules available for acquisition, are displayed. At 604, a selection of software modules for addition is received. At 606, a payment terms determined, based on the selection of software modules, and output to the technician for acceptance. Payment terms can include a payment schedule, payment amount, and payment conditions (i.e., subscription, per-use, etc.) At 608, payment information is received from the technician. At 610, transaction data is transmitted to the application server to complete payment and to manage the purchased service agreement.

Figure 7:
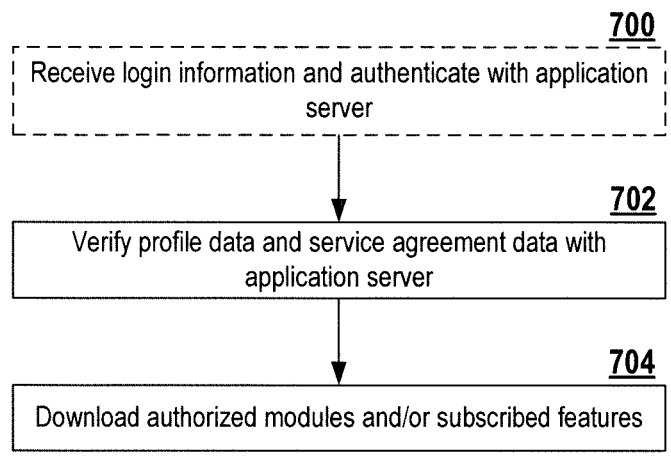
FIG. 7 is a flow diagram of an exemplary, non-limiting method for acquiring software modules in accordance with a subscription.

FIG. 7 illustrates a flow diagram of an exemplary, non-limiting method for acquiring software modules in accordance with a service agreement. At 700, the diagnostic application receives login information from the technician and authenticates with the application server. At 702, service agreement data is verified by the application server. At 704, software modules, features, and/or data, subject to one or more service agreements, is downloaded by the diagnostic application if not already downloaded. According to an aspect, the application service can obtain application profile data from the diagnostic application to determine which software modules are installed or unlocked on the mobile device.

Figure 8:
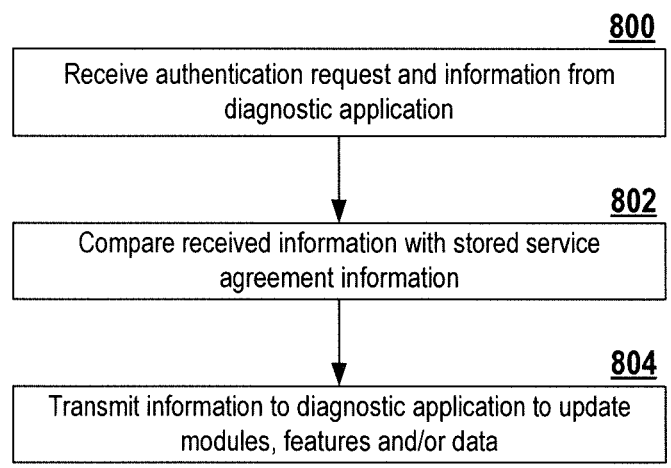
FIG. 8 is a flow diagram of an exemplary, non-limiting method for verifying a state of a diagnostic application.

Referring now to FIG. 8, a flow diagram of an exemplary, non-limiting method for verifying a state of a diagnostic application is illustrated. According to an aspect, this process can be performed by application server 120. At 800, an authentication request, application profile data, and service agreement information are received from a diagnostic application. At 802, the service agreement information received and application profile are compared with stored service agreement information. At 804, information is transmitted to the diagnostic application to update extension modules, features, or data in accordance with a result of the comparison. By way of example, the comparison can indicate that the diagnostic application does not include one or more modules, features, or data for which the technician is currently authorized. Accordingly, the application server can transmit the missing one or more modules, features, or data to the diagnostic application. According to another example, the comparison can indicate that updated versions of one or more modules, features, or data are available which are not loaded on the diagnostic application. Accordingly, the updated information can be transmitted to the diagnostic application. In yet another example, the comparison can indicate that the diagnostic application has an invalid service agreement. For instance, an invalid service agreement can be identified upon a first check-in by the diagnostic application following deactivation of a service agreement due to non-payment. An invalid service agreement can also occur due to expiration of an subscription period, or an attempt to utilize extension modules with an adapter having a identifier different than the identifier linked to the service agreement. In such situations involving an invalid service agreement, the application server can transmit a command to update the extension modules, features and/or data of to the diagnostic application to a deactivated state to prevent unauthorized use. In further examples, the application server can identify personalized promotions, product information, product recommendations, software updates, or the like, and transmit such data to the diagnostic application. Personalized data and recommendations can be based on user profile data associated with the technician, location data associated with the diagnostic application or mobile device, and/or application profile data.

Figure 9:
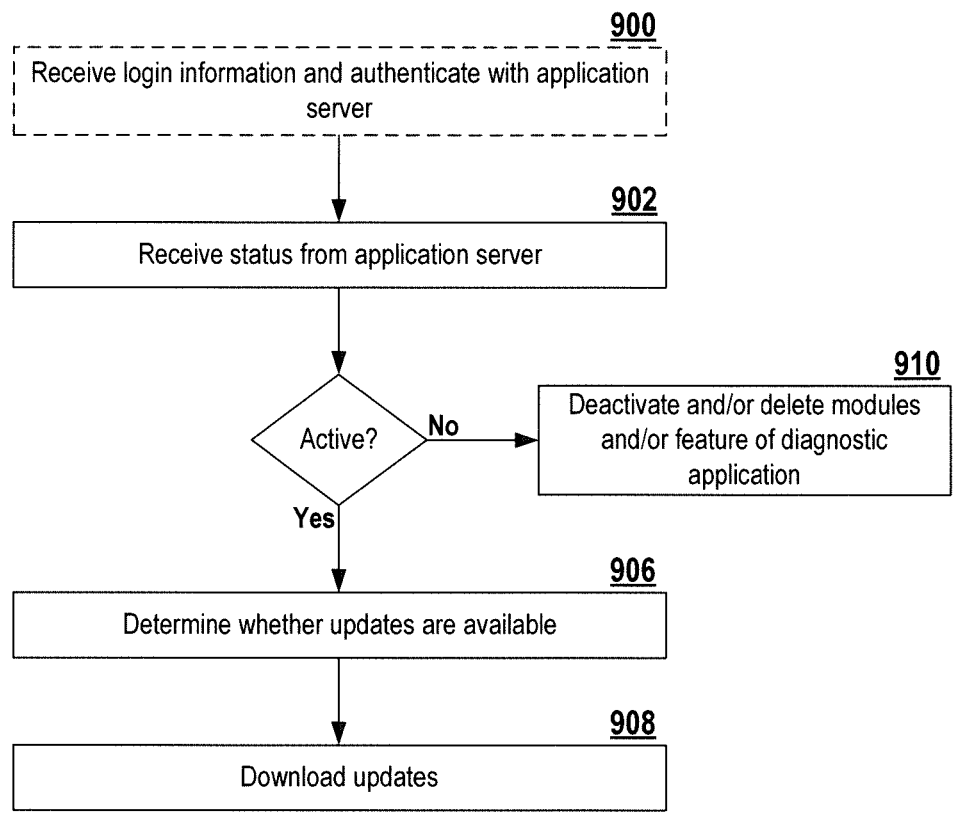
FIG. 9 is a flow diagram of an exemplary, non-limiting embodiment of a method for updating an diagnostic application according to one or more aspects.

FIG. 9 illustrates an exemplary, non-limiting embodiment of a method for updating diagnostic application and, specifically, updating extension modules, features, or data. According to an aspect, diagnostic application 112 is configured to require a check-in with application server 120 periodically (i.e., once a month, once a week, etc.) in order to verify service agreement statuses, receive updates, receive new information, and the like. According to another aspect, application server 120 can transmit push notification to diagnostic application 112 to notify technicians of pending updates, expired service agreements, promotions, new products, etc.

At 900, the diagnostic application receives login information from the technician and authenticates with the application server. At 902, service agreement status and version information are received from the application server. A determination is made, based on the service agreement status received, as to whether the service agreement is active. When active, it is determined, at 906, whether updates are available based on received version information. At 908, the updates are downloaded. When the service agreement is not active, the diagnostic application deactivates and/or deletes modules, features, and/or data subject to the inactive service agreement. It is to be appreciated that the determination above can be made by the application server. For instance, the diagnostic application can transmit application profile data to the application server, which determines whether updated software is available for download and notifies the diagnostic application of such updates. Moreover, upon authentication with the application server, the application service can issue a notification to deactivate or delete modules due to an inactive service agreement.

According to an aspect, the updates and/or notifications can include updated support data such as catalog data 324 or promotions data 322, in addition to software updates. As such, the catalog data 324 or promotions data 322 can be identified and downloaded by the diagnostic application even when the service agreement is invalid. In other words, according to an aspect, inactive service agreements only affect extension software modules, features, and/or data subject to service agreements and does not affect integrated modules, features, or data.

Figure 10:
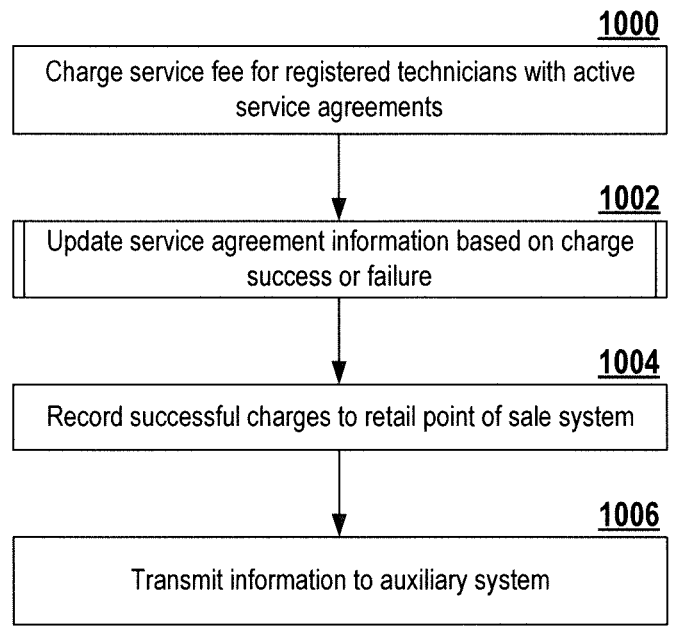
FIG. 10 is a flow diagram of an exemplary, non-limiting method of managing a subscription according to one or more aspects.

Turning now to FIG. 10, illustrated is an exemplary, non-limiting method of managing a service agreements according to one or more aspects. At 1000, service fees for registered technicians with active service agreements are automatically charged according to stored payment information. At 1002, service agreement information is updated based on a success or failure of the charge. At 1004, successful charges can be recorded to a retail point of sale system. At 1006, service agreement information and/or software utilization information is transmitted to an auxiliary for invoicing by third-party vendors.

Figure 11:
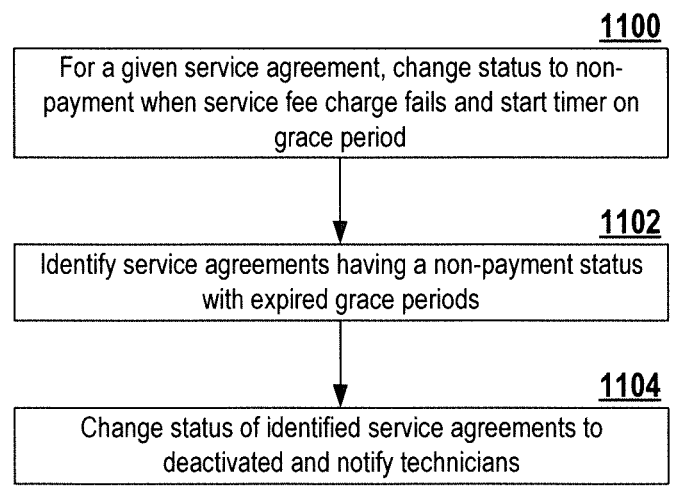
FIG. 11 is a flow diagram of an exemplary, non-limiting method of updating an subscription status.

FIG. 11 illustrates an exemplary, non-limiting method of updating a service agreement status. At 1100, for a given service agreement, a status is changed to a non-payment status when a charge of a service fee fails. A timer for a grace period is started. At 1102, service agreements having non-payment statuses with expired grace periods are identified. At 1104, statuses of the identified service agreements are changed to deactivated or invalid and the corresponding technicians are notified.

Exemplary Networked and Distributed Environments

One of ordinary skill in the art can appreciate that the various embodiments of a subscription-based diagnostic software service described herein can be implemented in connection with any computing device, client device, or server device, which can be deployed as part of a computer network or in a distributed computing environment such as the cloud. The various embodiments described herein can be implemented in substantially any computer system or computing environment having any number of memory or storage units, any number of processing units, and any number of applications and processes occurring across any number of storage units and processing units. This includes, but is not limited to, cloud environments with physical computing devices (e.g., servers) aggregating computing resources (i.e., memory, persistent storage, processor cycles, network bandwidth, etc.) which are distributed among a plurality of computable objects. The physical computing devices can intercommunicate via a variety of physical communication links such as wired communication media (e.g., fiber optics, twisted pair wires, coaxial cables, etc.) and/or wireless communication media (e.g., microwave, satellite, cellular, radio or spread spectrum, free-space optical, etc.). The physical computing devices can be aggregated and exposed according to various levels of abstraction for use by application or service providers, to provide computing services or functionality to client computing devices. The client computing devices can access the computing services or functionality via application program interfaces (APIs), web browsers, or other standalone or networked applications. Accordingly, aspects of the subscription-based diagnostic software service can be implemented based on such a cloud environment. For example, application server 120 can reside in the cloud environment such that the computer-executable instruction implementing the functionality thereof are executed with the aggregated computing resources provided by the plurality of physical computing devices. The cloud environment provides one or more methods of access to the application server 120, which are utilized by diagnostic application 112 on mobile device 110. These methods of access include IP addresses, domain names, URIs, etc. Since the aggregated computing resources can be provided by physical computing device remotely located from one another, the cloud environment can include additional devices such as a routers, load balancers, switches, etc., that appropriately coordinate network data.

Figure 12:
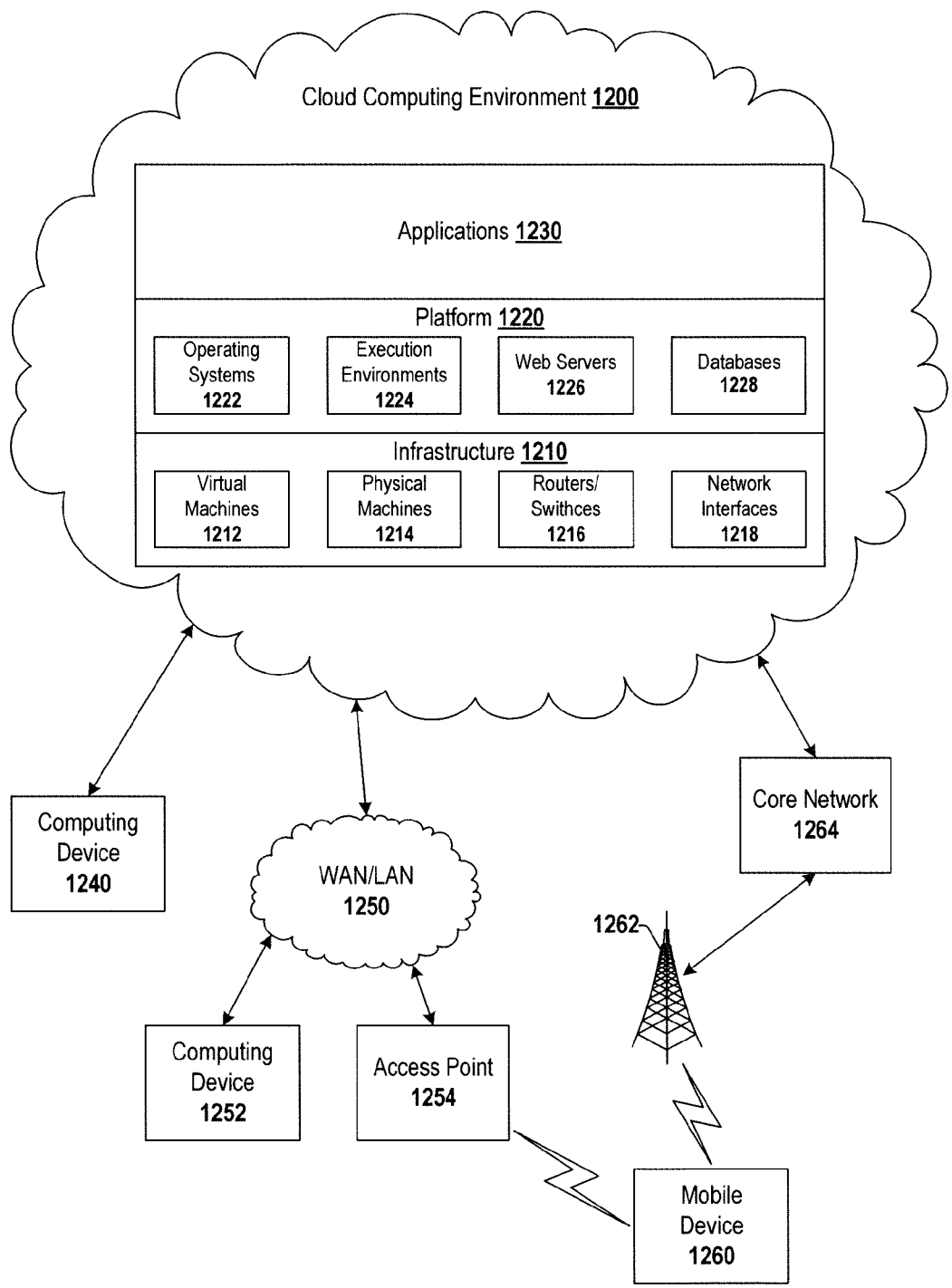
FIG. 12 is a block diagram representing an exemplary, non-limiting networked environment, including cloud or internet based, in which various embodiments described herein can be implemented.

FIG. 12 provides a schematic diagram of an exemplary networked or distributed computing environment, such as a cloud computing environment 1200. The cloud computing environment 1200 represents a collection of computing resources available, typically via the Internet, to one or more client devices. The cloud computing environment 1200 comprises various levels of abstraction: infrastructure 1210, a platform 1220, and applications 1230. Each level, from infrastructure 1210 to applications 1230 is generally implemented on top of lower levels, with infrastructure 1210 representing the lowest level.

Infrastructure 1210 generally encompasses the physical resources and components on which cloud services are deployed. For instance, infrastructure 1210 can include virtual machines 1212, physical machines 1214, routers/switches 1216, and network interfaces 1218. The network interfaces 1218 provide access to the cloud computing environment 1200, via the Internet or other network, from client devices such as computing devices 1240, 1252, 1260, etc. That is, network interfaces 1218 provide an outermost boundary of cloud computing environment 1200 and couple the cloud computing environment 1200 to other networks, the Internet, and client computing devices. Routers/switches 1216 couple the network interfaces 1218 to physical machines 1214, which are computing devices comprising computer processors, memory, mass storage devices, etc. Hardware of physical machines 1214 can be virtualized to provide virtual machines 1212. In an aspect, virtual machines 1212 can be executed on one or more physical machines 1214. That is, one physical machine 1214 can include a plurality of virtual machines 1212.

Implemented on infrastructure 1210, platform 1220 includes software that forming a foundation for applications 1230. The software forming platform 1220 includes operating systems 1222, programming or execution environments 1224, web servers 1226, and databases 1228. The software of platform 1220 can be installed on virtual machines 1212 and/or physical machines 1214.

Applications 1230 include user-facing software applications, implemented on platform 1220, that provide services to various client devices. In this regard, application server 120 of the diagnostic software service described herein is an example application 1230. As illustrated in FIG. 12, client devices can include computing devices 1240, 1252 and mobile device 1260. Computing devices 1240, 1252 can be directly coupled to the Internet, and therefore the cloud computing environment 1200, or indirectly coupled to the Internet via a WAN/LAN 1250. The WAN/LAN 1250 can include an access point 1254 that enables wireless communications (e.g., WiFi) with mobile device 1260. In this regard, via access point 1254 and WAN/LAN 1250, mobile device 1260 can communicate wirelessly with the cloud computing environment 1200. Mobile device 1260 can also wirelessly communicate according to cellular technology such as, but not limited to, GSM, LTE, WiMAX, HSPA, etc. Accordingly, mobile device 1260 can wireless communicate with a base station 1262, which is coupled to a core network 1264 of a wireless communication provider. The core network 1264 includes a gateway to the Internet and, via the Internet, provides a communication path to the cloud computing environment 1200.

Exemplary Computing Device

As mentioned, advantageously, the techniques described herein can be applied to any device where it is desirable to provide vehicle diagnostic functionality on a subscription basis. It can be understood, therefore, that handheld, portable and other computing devices and computing objects of all kinds are contemplated for use in connection with the various embodiments of an subscription-based diagnostic software service. Accordingly, the below general purpose computer described below in FIG. 13 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 13:
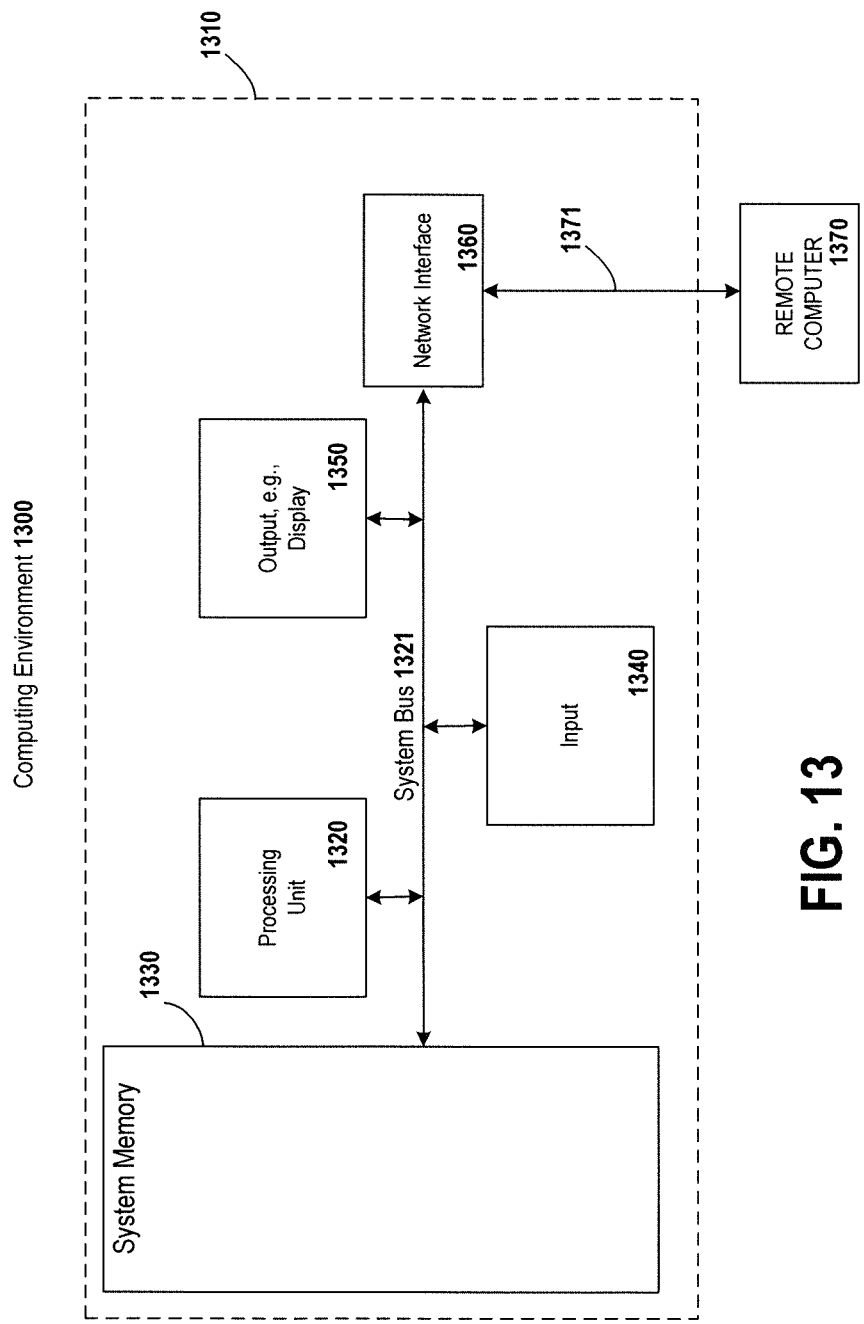
FIG. 13 is a block diagram representing an exemplary, non-limiting computing system or operating environment in which one or more aspects of various embodiments described herein can be implemented.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. In addition, the computing system environment 1300 is not intended to be interpreted as having any dependency relating to any one or combination of components illustrated in the exemplary computing system environment 1300.

With reference to FIG. 13, an exemplary device for implementing one or more embodiments includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, system memory 1330 may also include an operating system, application programs, other program modules, and program data. According to a further example, computer 1310 can also include a variety of other media (not shown), which can include, without limitation, RAM, ROM, EEPROM, flash memory or other memory technology, compact disk (CD) ROM, digital versatile disk (DVD) or other optical disk storage, or other tangible and/or non-transitory media which can be used to store desired information.

A user can enter commands and information into the computer 1310 through input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to implement a subscription-based diagnostic software service.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Illustrative embodiments have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile device, comprising:
a user interface;
a display;
a vehicle data transfer interface; and
a processor coupled to a non-transitory, computer-readable medium having stored thereon computer-executable instructions for a subscription software application for use in maintenance of a vehicle, the subscription software application, when executed by the processor, configuring the processor to:
output, on the display, a catalog of diagnostic software modules available for utilization by a vehicle maintenance technician to analyze vehicle data received by the vehicle data transfer interface;
receive, via the user interface, a selection of a desired diagnostic software module made by the vehicle maintenance technician from among the catalog of diagnostic software modules and a commitment of payment for a subscription to the desired diagnostic software module;

communicate the selection of the desired diagnostic software module and the commitment of payment to a remote system; and enable operation of the desired diagnostic software module by the vehicle maintenance technician on the mobile device in response to an authorization signal.

2. The mobile device of claim 1, further comprising a communication interface that communicatively couples the mobile device to the remote system to enable the processor to communicate the selection of the desired diagnostic software module.

3. The mobile device of claim 1, the subscription software application further configuring the processor to output the catalog of diagnostic software modules as a set of groups of diagnostic software modules, and to enable selection, via the user interface, of an individual diagnostic software module, one or more groups of diagnostic software modules, or an entirety of the set of groups of diagnostic software modules as the desired diagnostic software module.

4. The mobile device of claim 1, the subscription software application further configuring the processor to receive a notification of a failed payment for the subscription from the remote system and output the notification on the display.

5. The mobile device of claim 1, the subscription software application further configuring the processor to disable operation of the desired diagnostic software module in response to a deauthorization signal.

6. The mobile device of claim 1, wherein the vehicle data transfer interface comprises a wireless communication interface adapted to communicatively couple to an adapter that transfers the vehicle data from the vehicle to the mobile device.

7. The mobile device of claim 6, wherein the adapter comprises an identifier and wherein the subscription software application further configuring the processor to:
   communicate the identifier to the remote system; and
   enable operation of the desired diagnostic software module for vehicle data received from the adapter by the vehicle data transfer interface.

8. The mobile device of claim 1, the subscription software application further configuring the processor to receive the desired diagnostic software module, as a download from a data store, and to store the desired diagnostic software module to the non-transitory, computer-readable medium.

9. The mobile device of claim 1, the subscription software application further configuring the processor to enable operation of the desired diagnostic software module by enabling execution of the desired diagnostic software module on the processor.

10. The mobile device of claim 1, the subscription software application further configuring the processor to:
    communicate the vehicle data received via the vehicle data transfer interface to an server for analysis by the desired diagnostic software module;
    receive an analysis result from the server; and
    output the analysis result to the display.

11. A non-transitory, computer-readable storage medium having stored thereon computer-executable instructions for enabling operation of a subscription-based diagnostic software module for use in maintenance of a vehicle, the computer-executable instructions comprising:
    a subscription software application configured to be executed by a processor of a mobile device, with the mobile device further having a user interface, a display, and a vehicle data transfer interface, wherein the subscription software application, when executed by the processor, enables the processor to:
        display a catalog of diagnostic software modules available for utilization by a vehicle maintenance technician to analyze vehicle data received by the vehicle data transfer interface;
        receive a selection of a desired diagnostic software module made by the vehicle maintenance technician from among the catalog of diagnostic software modules and a commitment of payment for a subscription to the desired diagnostic software module;
        communicate the selection of the desired diagnostic software module and the commitment of payment to a remote system; and
        enable operation of the desired diagnostic software module by the vehicle maintenance technician on the mobile device in response to an authorization signal.

12. The non-transitory, computer-readable medium of claim 11, wherein the subscription software application further enables the processor to periodically check-in with the remote system to receive pending notifications.

13. The non-transitory, computer-readable medium of claim 11, wherein the subscription software application further enables the processor to receive promotional information from the remote system and to display the promotional information on the display.

14. The non-transitory, computer-readable medium of claim 11, wherein the subscription software application further enables the processor to determine a location of the mobile device and communicate the location to the remote system.

15. The non-transitory, computer-readable medium of claim 11, wherein the subscription software application further enables the processor to receive user information from the vehicle maintenance technician via the user interface, generate a user profile based on the user information received, and associate the subscription to the desired diagnostic software module with the user profile.

16. The non-transitory, computer-readable medium of claim 15, wherein the subscription software application further enables the processor to prompt the vehicle maintenance technician to input login information via the user interface, authenticate the vehicle maintenance technician with the login information and the user profile, and enable operation of the desired diagnostic software module upon successful authentication.

17. The non-transitory, computer-readable medium of claim 11, wherein the subscription software application further enables the processor to receive payment information usable to make a payment for the subscription from the vehicle maintenance technician via the user interface, and to communicate the payment information to the remote system.

18. The non-transitory, computer-readable medium of claim 11, wherein the subscription software application further configuring the processor to disable operation of the desired diagnostic software module in response to an deauthorization signal.

19. A non-transitory, computer-readable storage medium having stored thereon computer-executable instructions for a subscription-based diagnostic software service for use in maintenance of a vehicle, the computer-executable instructions comprising:
    a subscription software application configured to be executed by a processor to enable the processor to:
        communicate with a mobile device having a user interface, wherein the user interface of the mobile device is configured to enable a vehicle maintenance technician to select a desired diagnostic software module from a catalog of diagnostic software modules, and wherein the desired diagnostic software module is configured to analyze data from a vehicle for use in maintenance of the vehicle;

receive the selection of the desired diagnostic software module;

generate a service agreement for a subscription to the desired diagnostic software module, the service agreement specifying subscription payment terms; and authorize operation of the desired diagnostic software module on the mobile device upon commitment of payment.

20. The non-transitory, computer-readable medium of claim 19, wherein the subscription software application further enables the processor to communicate with a server configured to support the operation of the desired diagnostic software module on the mobile device and, upon commitment of payment, instruct the server to activate the desired diagnostic software module on the mobile device.

21. The non-transitory, computer-readable medium of claim 19, wherein the subscription software application further enables the processor to periodically process payment for the subscription to the desired diagnostic software module in accordance with the subscription payment terms.

22. The non-transitory, computer-readable medium of claim 21, wherein the subscription software application further enables the processor to communicate a notification to the mobile device when payment processing fails.

23. The non-transitory, computer-readable medium of claim 21, wherein the subscription software application further enables the processor to record processed payments to a retail point-of-sale system.

24. The non-transitory, computer-readable medium of claim 21, wherein the subscription software application further enables the processor to deauthorize operation of the desired diagnostic software module on the mobile device when payment processing fails.

25. The non-transitory, computer-readable medium of claim 21, wherein the subscription software application further enables the processor to communicate with a server configured to support the operation of the desired diagnostic software module on the mobile device and, upon failed payment processing, to instruct the server to deactivate the desired diagnostic software module on the mobile device.

26. The non-transitory, computer-readable medium of claim 19, wherein the subscription software application further enables the processor to communicate with an auxiliary system to provide an accounting of the subscription to the desired diagnostic software module.

27. The non-transitory, computer-readable medium of claim 19, wherein the subscription software application further enables the processor to register the vehicle maintenance technician based on information received from the mobile device, the information being obtained from the vehicle maintenance technician via the user interface of the mobile device.

28. The non-transitory, computer-readable medium of claim 19, wherein the subscription software application further enables the processor to communicate at least one of promotional information, product catalog information, or authorized distributor information to the mobile device.

29. The non-transitory, computer-readable medium of claim 28, wherein the subscription software application further enables the processor to receive, from the mobile device, location information specifying a location of at least one of the vehicle maintenance technician or the mobile device, and to communicate the at least one of the promotional information, the product catalog information, or the authorized distributor information based on the location information.

30. The non-transitory, computer-readable medium of claim 19, wherein the subscription software application further enables the processor to authorize operation of updated versions of the desired diagnostic software module when the updated versions become available.

* * * * *